US012469658B2

(12) United States Patent
Munoz et al.

(10) Patent No.: US 12,469,658 B2
(45) Date of Patent: *Nov. 11, 2025

(54) DEVICE FOR REVERSED HANDLE OPERATION OF A CIRCUIT BREAKER

(71) Applicant: Siemens Industry, Inc., Alpharetta, GA (US)

(72) Inventors: Mario Munoz, Buford, GA (US); Mauricio Rodriguez, Duluth, GA (US); Lawrence Navarre, Norcross, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 286 days.

This patent is subject to a terminal disclaimer.

(21) Appl. No.: 18/474,689

(22) Filed: Sep. 26, 2023

(65) Prior Publication Data

US 2025/0104942 A1 Mar. 27, 2025

(51) Int. Cl.
*H01H 21/22* (2006.01)
*H01H 21/04* (2006.01)

(52) U.S. Cl.
CPC ............ *H01H 21/22* (2013.01); *H01H 21/04* (2013.01)

(58) Field of Classification Search
CPC ........... H01H 2013/05; H01H 2050/02; H01H 2203/04; H01H 2221/00; H01H 2221/016; H01H 2221/024; H01H 21/00; H01H 21/04; H01H 21/22; H01H 73/00; H01H 73/02; H01H 73/04; H01H 73/06; H01H 73/24; H01H 2003/00; H01H 2003/007; H01H 2003/028; H01H 2009/02; H01H 2009/20; H01H 71/00; H01H 71/02; H01H 71/0207; H01H 71/025; H01H 71/52; H01H 71/521; H01H 71/522; H01H 71/56; H01H 71/526; H01H 71/0264; H01H 71/101018
USPC .................................................. 200/237, 335
See application file for complete search history.

(56) References Cited

U.S. PATENT DOCUMENTS

| | | | | |
|---|---|---|---|---|
| 6,252,480 B1 | 6/2001 | Kramer | | |
| 6,423,913 B1 * | 7/2002 | Gupta | H01H 9/282 | 200/43.14 |
| 2016/0126034 A1 * | 5/2016 | Fischer | H01H 21/22 | 200/50.32 |

* cited by examiner

*Primary Examiner* — Anthony R Jimenez

(57) ABSTRACT

A device for reversed operation of a first handle is provided. The first handle is of a circuit breaker. The device includes a housing that is attachable to the circuit breaker, and a lever that is rotatably attached to the housing. The lever includes a body, and an arm and a second handle each extending away from the body. The lever is movable in a first direction relative to the housing in response to a force at the second handle, such that when the housing is attached to the circuit breaker and the lever moves in the first direction relative to the housing, the first arm is configured to press against and move the first handle of the circuit breaker in a second direction relative to the housing, the second direction being away from the first direction.

20 Claims, 7 Drawing Sheets

DEVICE FOR REVERSED HANDLE OPERATION OF A CIRCUIT BREAKER

BACKGROUND

1. Field of the Disclosure

The present disclosure is generally directed to circuit breakers and, more specifically, to a device for reversed handle operation of a circuit breaker.

2. Description of Related Art

One of the limiting factors for electric vehicle (EV) adoption is that multi-family residences may not have access to charging stations with the same functions and costs as a charging station used in a single-family residence. A multi-family residence is a classification of housing where multiple housing units are contained within one building or multiple buildings within a complex or community. Types of multi-family residences include, for example, duplexes, townhomes, apartments, condominiums, mobile homes, and manufactured home parks.

An issue with charging stations for multi-family residences is that existing multi-family modular metering devices may include only one circuit breaker connected to one electrical meter. This circuit breaker, referred to as a tenant circuit breaker, may be directly connected to one unit of the multi-family residence and provides protection for electrical loads associated with the one unit, such as, for example from home appliances within the one unit.

Parking spaces in multi-family residences may not be directly adjacent or near the one unit. In order to connect an EV charging station to the one electrical meter, a tap connector may be used to split electrical current between the tenant circuit breaker and the electrical loads associated with the one unit so as to provide power to the EV charging station. Under this wiring method, the EV charging station shares the electrical current with the electrical loads at the one unit. The splitting of the electrical current between the tenant circuit breaker and the electrical loads associated with the one unit, however, requires additional load management devices to prevent overloading the tenant breaker.

SUMMARY

In one example, a device for reversed operation of a first handle is provided. The first handle is of a circuit breaker. The device includes a housing that is attachable to the circuit breaker, and a lever that is rotatably attached to the housing. The lever includes a body, and an arm and a second handle each extending away from the body. The lever is movable in a first direction relative to the housing in response to a force at the second handle, such that when the housing is attached to the circuit breaker and the lever moves in the first direction relative to the housing, the first arm is configured to press against and move the first handle of the circuit breaker in a second direction relative to the housing. The second direction is away from the first direction.

In one example, the arm is a first arm. The lever further includes a second arm that extends away from the body of the lever. When the housing is attached to the circuit breaker, the lever is positioned over the first handle, such that the first arm and the second arm are disposed on opposite sides of the first handle, respectively.

In one example, the lever is movable in a third direction relative to the housing, such that when the housing is attached to the circuit breaker and the lever moves in the third direction relative to the housing, the second arm is configured to press against and move the first handle of the circuit breaker in a fourth direction relative to the housing. The fourth direction is away from the third direction.

In one example, the housing is a mounting plate.

In one example, the mounting plate has a first side, a second side, and an outer surface extending between the first side and the second side. The second side is opposite the first side. The device further includes a first tab extending away from the outer surface of the mounting plate at the first side of the mounting plate, a second tab extending away from the outer surface of the mounting plate at the second side of the mounting plate, and a shaft attached to and extending between the first tab and the second tab, respectively. The lever is rotatable about the shaft.

In one example, the device further includes at least one window extending through the mounting plate at the outer surface.

In one example, the device further includes a first spacer positioned about the shaft and between the first tab and the lever, and a second spacer positioned about the shaft and between the second tab and the lever.

In one example, the first spacer and the second spacer are attached to opposite sides of the body of the lever, respectively.

In one example, the lever, the first spacer, and the second spacer form a single part.

In one example, the lever, the first spacer, and the second spacer are made of a plastic, and the mounting plate is made of sheet metal.

In one example, the mounting plate has a first side and a second side opposite the first side. The device further includes a first connector extending away from the mounting plate at the first side of the mounting plate, and a second connector extending away from the mounting plate at the second side of the mounting plate. The first connector is configured to engage with a first side of a housing of the circuit breaker, and the second connector is configured to engage with a second side of the housing of the circuit breaker that is opposite the first side of the housing of the circuit breaker.

In one example, the first connector and the second connector are spring retainers.

In one example, the first direction is a first rotational direction, and the second direction is a second rotational direction. The second rotational direction is opposite the first rotational direction.

In one example, a device for reversed operation of a first handle is provided. The first handle is of a circuit breaker. The device includes a mounting plate that is attachable to the circuit breaker, and a lever that is rotatably attached to the mounting plate. The lever includes a body, and a first arm, a second arm, and a second handle each extending away from the body. When the mounting plate is attached to the circuit breaker, the lever is positioned over the first handle, such that the first arm and the second arm are disposed on opposite sides of the first handle, respectively. The lever is movable in a first direction relative to the mounting plate in response to a first force at the second handle, such that when the mounting plate is attached to the circuit breaker and the lever moves in the first direction relative to the mounting plate, the first arm is configured to press against and move the first handle of the circuit breaker in a second direction relative to the mounting plate. The second direction is away from the first direction. The lever is movable in a third direction relative to the mounting plate, such that when the mounting plate is attached to the circuit breaker and the lever moves in the third direction relative to the mounting plate, the second arm is configured to press against and move the first handle of the circuit breaker in a fourth direction relative to the mounting plate, the fourth direction is away from the third direction.

In one example, the mounting plate has a first side, a second side, and an outer surface extending between the first side and the second side. The second side is opposite the first side. The device further includes a first tab extending away from the outer surface of the mounting plate at the first side of the mounting, a second tab extending away from the outer surface of the mounting plate at the second side of the mounting plate, and a shaft attached to and extending between the first tab and the second tab, respectively. The lever is rotatable about the shaft.

In one example, the device further includes a first spring retainer extending away from the mounting plate at the first side of the mounting plate, and a second spring retainer extending away from the mounting plate at the second side of the mounting plate. The first spring retainer is configured to engage with a first side of a housing of the circuit breaker, and the second spring retainer is configured to engage with a second side of the housing of the circuit breaker that is opposite the first side of the housing of the circuit breaker.

In one example, the device further includes a first spacer positioned about the shaft and between the first tab and the lever. The first spacer is attached to a first side of the body of the lever. The device also includes a second spacer positioned about the shaft and between the second tab and the lever. The second spacer is attached to a second side of the body of the lever. The second side of the body of the lever is opposite the first side of the body of the lever.

In one example, a circuit breaker assembly includes a circuit breaker. The circuit breaker includes a first housing and a first handle movably attached to the first housing. The circuit breaker assembly also includes a device for reversed operation of the first handle of the circuit breaker. The device includes a lever. The lever includes a body, and a first arm, a second arm, and a second handle each extending away from the body. The device also includes a second housing that is removably attached to the first housing of the circuit breaker, such that the lever is positioned over the first handle, and the first arm and the second arm of the lever are disposed on opposite sides of the first handle, respectively. The lever is rotatably attached to the second housing and rotatable in a first direction relative to the second housing in response to a force at the second handle, such that when the lever rotates in the first direction relative to the housing, the first arm is configured to press against and move the first handle of the circuit breaker in a second direction relative to the second housing. The second direction is away from the first direction.

In one example, the second housing has a first side, a second side, and an outer surface extending between the first side and the second side. The second side is opposite the first side. The device further includes a first tab extending away from the outer surface of the second housing at the first side of the second housing, a second tab extending away from the outer surface of the second housing at the second side of the second housing, and a shaft attached to and extending between the first tab and the second tab, respectively. The lever is rotatable about the shaft.

In one example, the device further includes a first connector extending away from the second housing at the first side of the mounting plate, and a second connector extending away from the second housing at the second side of the mounting plate. The first connector is configured to engage with a first side of the first housing of the circuit breaker, and the second connector is configured to engage with a second side of the first housing that is opposite the first side of the first housing.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
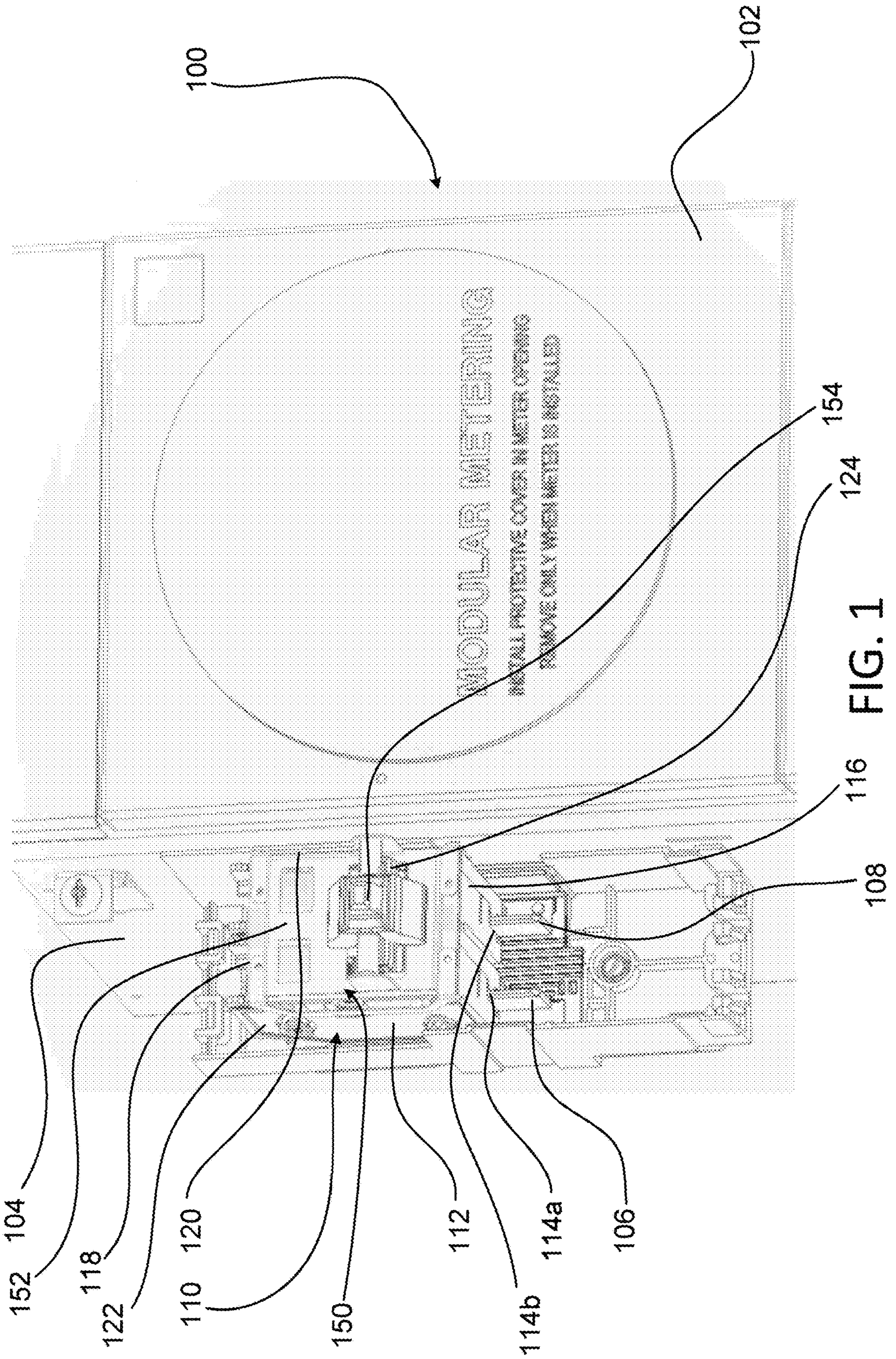
FIG. 1 is perspective view of one embodiment of a reversed handle operation device attached to a circuit breaker installed within a modular meter stack.
Figure 2:
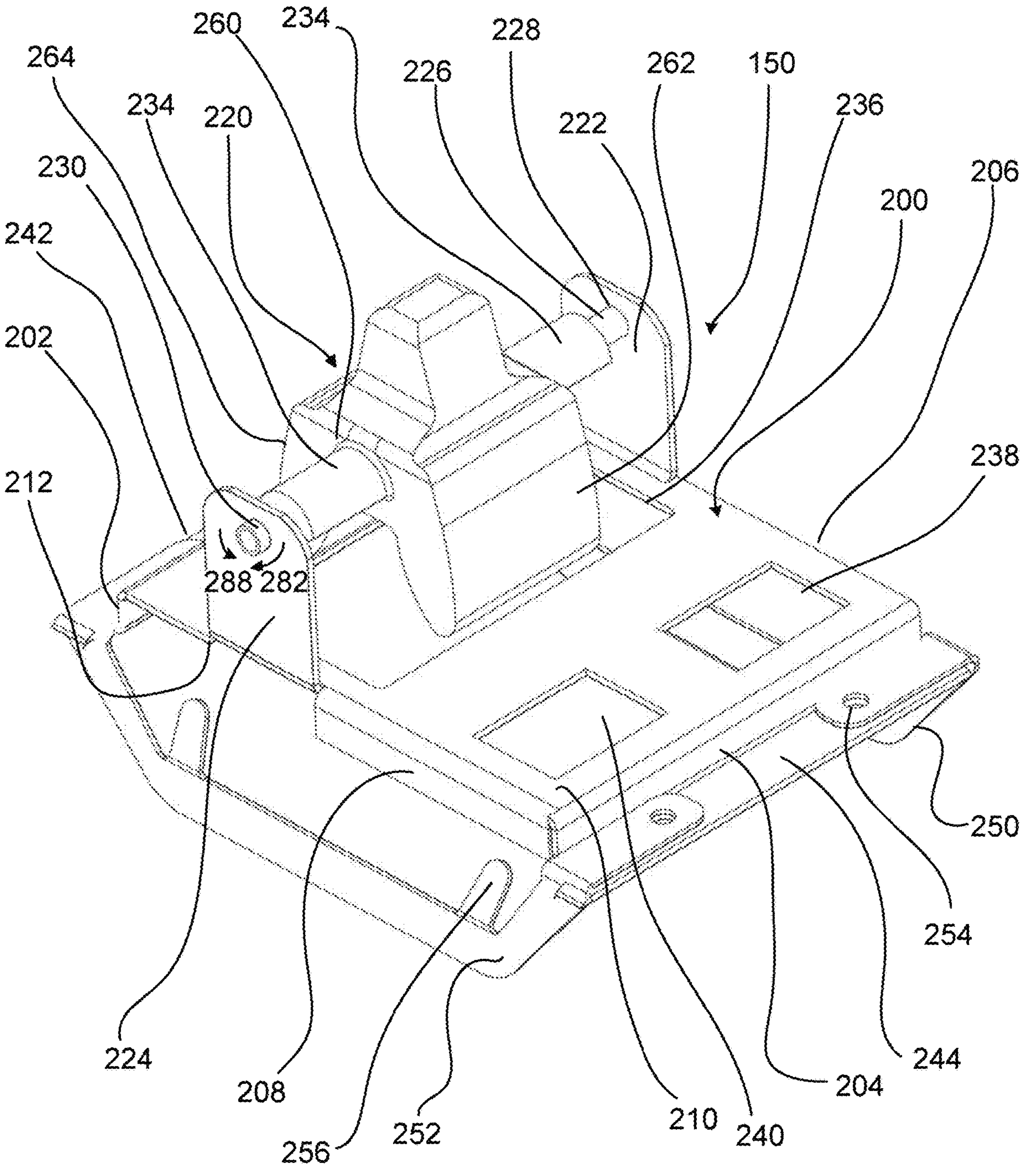
FIG. 2 is a first perspective view of one embodiment of a reversed handle operation device.
Figure 3:
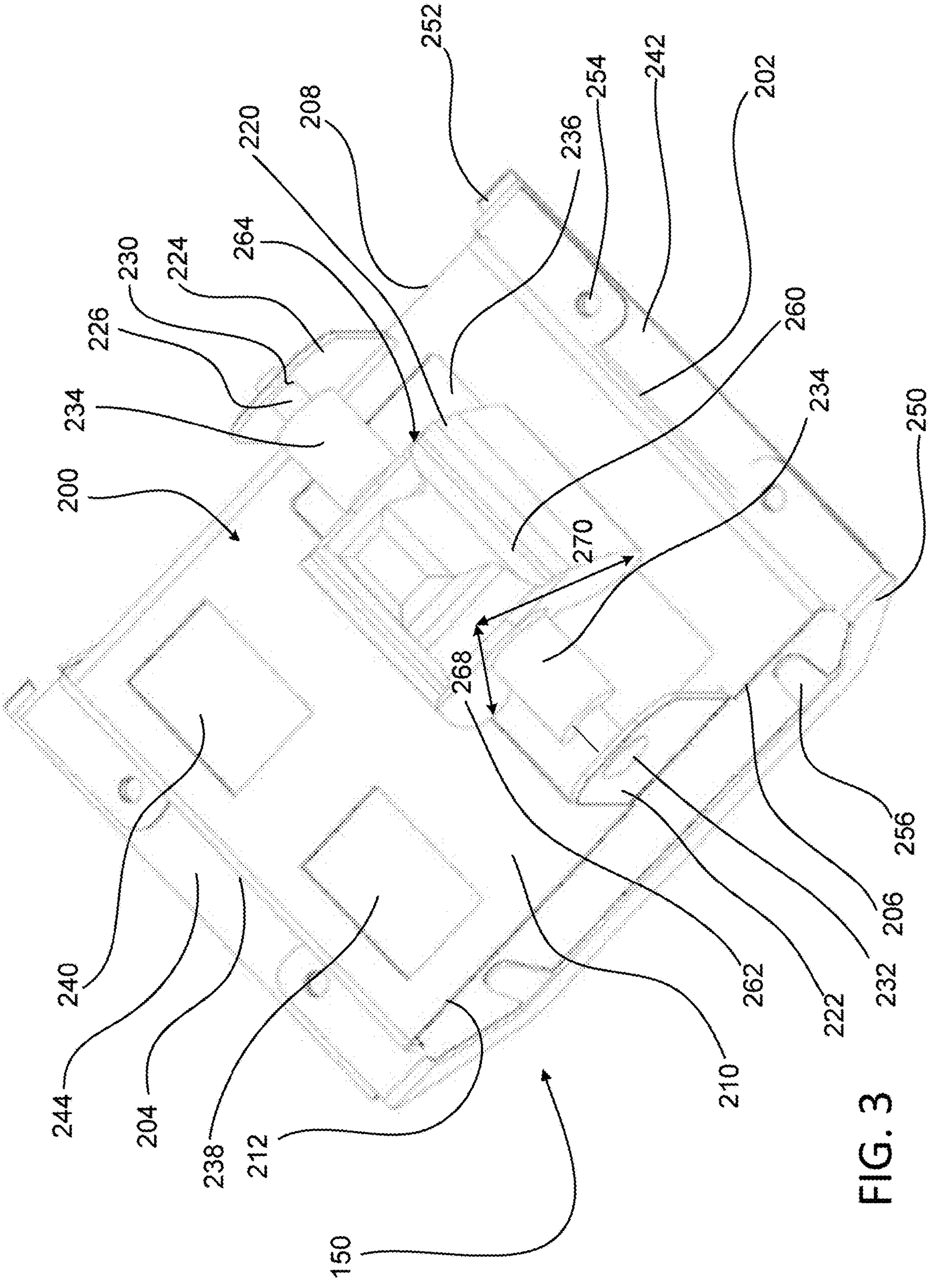
FIG. 3 is a second perspective view of the reversed handle operation device of FIG. 2.
Figure 4:
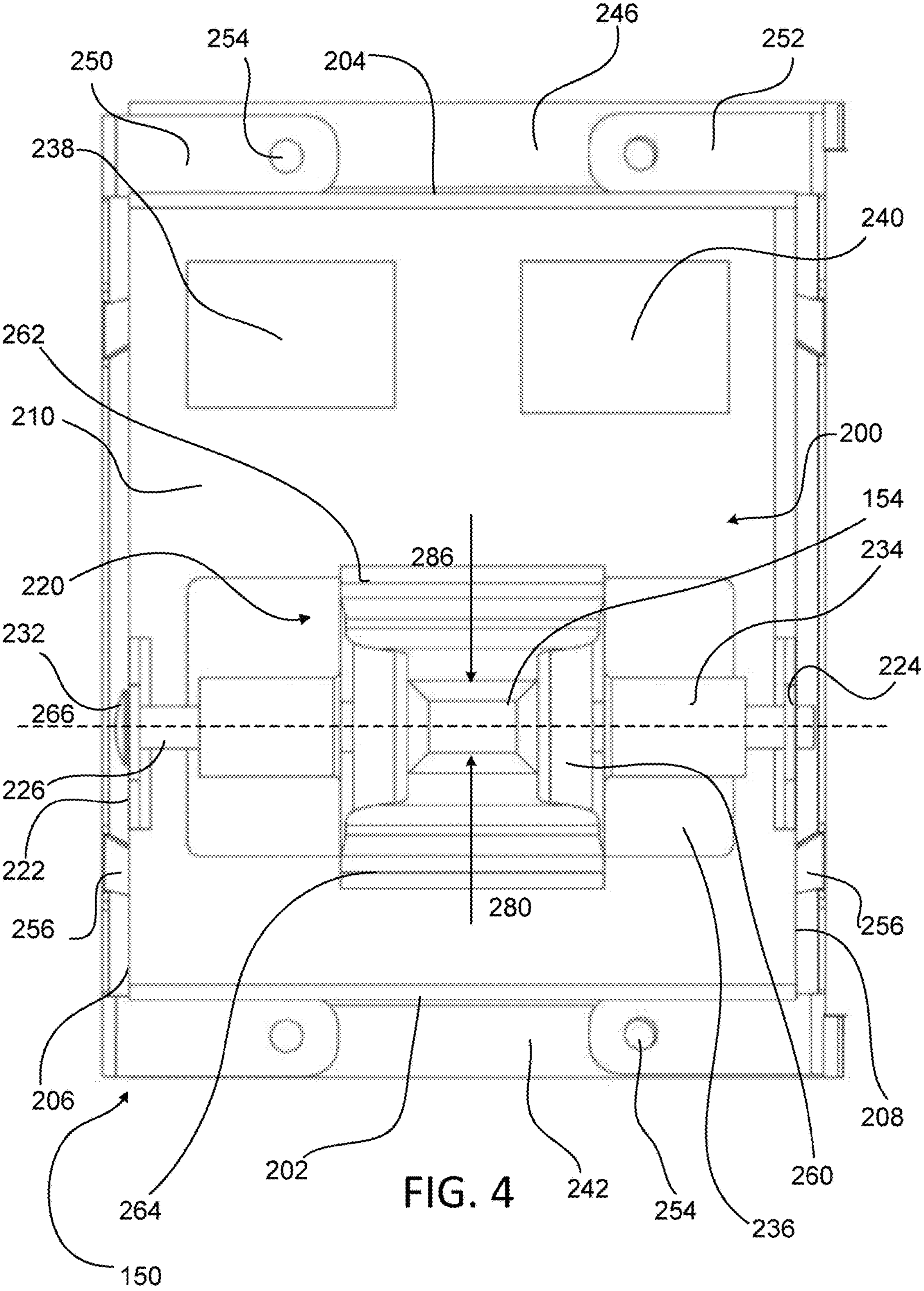
FIG. 4 is a top view of the reversed handle operation device of FIG. 2.

The addition of an electrical load associated with the EV charging station to the loads associated with the one unit may cause issues. For example, the EV charging station may use more current or power than is available. An EV charging station may use, for example, 32 Amps or more. In combination with the loads associated with the one unit (e.g., appliances and/or devices running at the one unit), this may either trip or disable the tenant circuit breaker, which may be limited to 60-225 Amps. Accordingly, a tenant of the one unit may not be able to use certain appliances or devices while the EV charging station is in use (e.g., while the EV is charging).

A load management device may be added to the system to solve this issue. Load management devices may prevent the EV charging station from operating or may allow the EV charging station to operate at a reduced charging rate if there is not enough capacity. This may lead to an underused or unusable EV. Further, the use of a load management device results in additional complexity (e.g., additional components, and additional setup and configuration) and cost.

Two circuit breakers, a first circuit breaker (e.g., a tenant breaker) electrically connected to the respective unit and a second circuit breaker electrically connected to an EV charging station, may be provided for a unit (e.g., each unit) of a multi-family residence to avoid the use of a load management device, and the associated additional complexity and cost. Each of the two parallel circuit breakers may be a double pole (e.g., 2-pole) circuit breaker. The two circuit breakers may be connected to two conductors (e.g., bus stabs for the two poles) in parallel. The bus stabs are configured to supply power for parallel circuits including the first circuit breaker (e.g., circuit(s) powering appliances and/or devices at the one unit) and the second circuit breaker (e.g., a circuit powering the EV charging station), respectively.

The bus stabs, to which the first circuit breaker and the second circuit breaker are both electrically connected, may extend in directions parallel to each other (e.g., vertically relative to the ground) and may be spaced apart from each other. Each of the two circuit breakers includes two slots (e.g., within housings of the two circuit breakers, respectively) that correspond to the bus stabs, and the bus stabs are positioned and fixed within the two slots of the respective circuit breaker, respectively, to physically and electrically connect the respective circuit breaker to the bus stabs.

The two slots for the bus stabs extend from a first side of the housing of the respective circuit breaker, into the respective circuit breaker. In order for both of the two circuit breakers to be electrically and physically connected to the same two bus stabs, the two circuit breakers are stacked one (e.g., the second circuit breaker) on top of the other (e.g., the first circuit breaker), and the second circuit breaker, for example, is rotated 180° relative to the first circuit breaker, so that the bus stabs may be positioned within the two slots of the second circuit breaker.

The flipped orientation of the second circuit breaker (e.g., rotated 180° relative to the first circuit breaker), for example, provides that a handle of the second circuit breaker is in a bottom position (e.g., relative to the housing of the second circuit breaker) when the second circuit breaker is "ON," and a handle of the first circuit breaker is in a top position (e.g., relative to the housing of the first circuit breaker) when the first circuit breaker is "ON." This is confusing to a user and may go against code and/or standards. Code and/or standards may require that if a circuit breaker is mounted vertically relative to a surface ultimately supporting the circuit breaker (e.g., the ground or a floor of a structure such as a multi-family residence), upward motion of the handle relative to the housing of the circuit breaker turns the circuit breaker "ON," while downward motion of the handle relative to the housing of the circuit breaker turns the circuit breaker "OFF."

The present embodiments provide a device for reversed operation of a handle of a circuit breaker (e.g., a first handle). The device is mountable to the circuit breaker and includes a housing (e.g., a mounting plate) and a lever rotatably attached to the mounting plate, for example. The lever may include a second handle and at least one arm (e.g., two arms). The lever may at least partially cover the first handle of the circuit breaker when the device is mounted to the circuit breaker, and the two arms of the lever, for example, may be disposed on opposite sides of the first handle, respectively.

When a first force (e.g., in a first force direction) is applied to the second handle of the lever, the lever rotates in a first direction (e.g., a first rotational direction relative to the mounting plate). The rotation of the lever in the first direction causes a first arm of the two arms to press against the first handle of the circuit breaker and move the first handle in a second direction (e.g., a first translational direction or a second rotational direction opposite the first rotational direction, relative to the mounting plate). For example, as the lever rotates in the first direction, the second handle of the device moves towards an upward position of the second handle (e.g., a top position of the second handle), and the first arm of the lever moves the first handle of the circuit breaker in the second direction, towards a downward position of the first handle (e.g., a bottom position of the first handle).

When a second force is applied (e.g., in a second force direction opposite the first force direction) to the second handle of the lever, the lever rotates in a third direction (e.g., the second rotational direction relative to the mounting plate). The rotation of the lever in the third direction causes a second arm of the two arms to press against the first handle of the circuit breaker and move the first handle in a fourth direction (e.g., a second translational direction opposite the first translational direction, or the first rotational direction, relative to the mounting plate). For example, as the lever rotates in the third direction, the second handle of the device moves towards a downward position of the second handle (e.g., a bottom position of the second handle), and the second arm of the lever moves the first handle of the circuit breaker in the fourth direction, towards an upward position of the first handle (e.g., a top position of the first handle).

Accordingly, when a circuit breaker is positioned in a flipped orientation (e.g., the circuit breaker is "ON" when a handle of the circuit breaker is in a downward position) and the device of the present embodiments is attached to the circuit breaker, the handle of the device is in an upward position (e.g., a top position) when the circuit breaker is "ON" with the handle of the circuit breaker in the downward position. The user may thus quickly determine a state of the circuit breaker via a position (e.g., an upward position or a downward position) of the handle of the device of the present embodiments.

Turning to the drawings, FIG. 1 shows an example of a modular meter stack 100 for, for example, a multi-family residence. The modular meter stack 100 includes a plurality of metering devices 102 supported within a housing 104 of the modular meter stack 100. Each metering device 102 of the plurality of metering devices 102 is configured to quantify an amount of electricity that is used by respective devices (e.g., appliances at a unit of the multi-family residence and/or an EV charging station associated with the unit of the multi-family residence) monitored by the respective metering device 102. Any type of metering device 102 may be used. For example, the respective metering device 102 may be an analog metering device or a digital metering device.

A metering device 102 of the plurality of metering devices 102, for example, may be connected to a main circuit breaker and/or any other power distribution system that supplies power. The metering device 102 is connected to bus stabs 106 and 108 of the modular meter stack 100 via a meter socket (not shown) and bus bars (not shown) of the modular meter stack 100. The bus stabs 106 and 108 may run in directions parallel to each other and are spaced apart from each other. For example, the bus stabs 106 and 108 run vertically relative to a side (e.g., an upper side) of the metering device 102 or a housing of the modular meter stack 100. Other configurations may be provided.

Two circuit breakers may be connected to the bus stabs 106 and 108 in parallel. The two circuit breakers are configured to stop the flow of current as a safety measure (e.g., when drawn current exceeds a safety threshold). For example, a first circuit breaker (not shown) and a second circuit breaker 110 may be stacked one on top of the other, and both the first circuit breaker and the second circuit breaker 110 may be connected to both of the bus stabs 106 and 108. In one embodiment, the modular meter stack 100 includes two circuit breakers for each metering device 102 of the plurality of metering devices 102.

In one embodiment, the first circuit breaker is a tenant circuit breaker, and the second circuit breaker 110 is an EV charging station circuit breaker. In the embodiment shown in FIG. 1, the second circuit breaker 110 is a top circuit breaker in the stack, and the tenant circuit breaker is a bottom circuit breaker in the stack. In another embodiment, the EV charging station circuit breaker 110 is the bottom circuit breaker in the stack, and the tenant circuit breaker is the top circuit breaker in the stack. The tenant circuit breaker may be connected to one or more residential appliances or devices within a unit of the multi-family residence, for example. The EV charging station circuit breaker 110 is connected to an EV charging station associated with the unit of the multi-family residence, for example.

The first circuit breaker may be any number of different types of circuit breaker (e.g., for a unit of a multi-family residence). For example, the first breaker may be a two-pole (e.g., double pole) circuit breaker with a rating of 60 to 225 A (e.g., 100 A). The first circuit breaker may supply, for example, 240 volt power. The second circuit breaker 110 may be the same or different than the first circuit breaker. The second circuit breaker 110 may be any number of different types of circuit breaker (e.g., for an EV charger). For example, the second circuit breaker 110 may be a two-pole (e.g., double pole) circuit breaker with a rating of 60 to 225 A (e.g., 100 A). The second circuit breaker 110 may supply, for example, 240 volt power.

Other types of circuit breakers may be used for the first circuit breaker and/or the second circuit breaker 110. For example, the first circuit breaker and/or the second circuit breaker 110 may be rated at a different Amperage. As another example, smart or intelligent circuit breakers, electromechanical or electronic circuit breakers, or any combination thereof may be used for the first circuit breaker and/or the second circuit breaker 110.

As shown in FIG. 1 and discussed above, the second circuit breaker 110 (e.g., and the first circuit breaker, not shown) may be a double pole circuit breaker. The second circuit breaker 110 (e.g., and the first circuit breaker), for example, includes a housing 112 and two slots 114*a* and 114*b* (e.g., female connectors) through the housing 112 and into the second circuit breaker 110. The bus stabs 106 and 108 may be connected to two phases (e.g., phase A and phase B) of three phase service.

The bus stabs 106 and 108 are positionable within the two slots 114*a* and 114*b* within the housing 112 of the second circuit breaker 110, for example, when the second circuit breaker 110 is installed within the modular meter stack 100. The connection of the bus stabs 106 and 108 to the second circuit breaker 110 within the two slots 114*a* and 114*b*, respectively, electrically connects the second circuit breaker 110 to the main circuit breaker and/or the other power distribution system via the metering device 102.

While FIG. 1 only shows one of the two circuit breakers (e.g., the second circuit breaker 110) associated with the metering device 102, for example, the first circuit breaker may be mounted to the modular meter stack 100 underneath the second circuit breaker 110, such that the second circuit breaker 110 is stacked on top of the first circuit breaker for compact packaging of the two circuit breakers within the modular meter stack 100. As discussed above, the first circuit breaker also includes two slots within which the first circuit breaker is connectable to the bus stabs 106 and 108, respectively. For example, the first circuit breaker may be connected to exposed portions of the bus stabs 106 and 108, respectively, shown in FIG. 1.

The housing 112 of the second circuit breaker 110, for example, may be any number of shapes including, for example, rectangular. For example, the housing 112 of each of the two circuit breakers (e.g., the first circuit breaker and the second circuit breaker 110) includes a first side 116, a second side 118 opposite the first side 116, a third side 120 extending between the first side 116 and the second side 118, and a fourth side 122 opposite the third side 120 and extending between the first side 116 and the second side 118. The two slots 114*a* and 114*b* extend through the first side 116 of the housing 112 of the respective circuit breaker (e.g., the second circuit breaker 110).

The second circuit breaker 110 is rotated 180° relative to the first circuit breaker to allow for the stacked arrangement of the first circuit breaker and the second circuit breaker 110. Accordingly, the first side 116, which is a top side in a typical mounted position of the second circuit breaker 110 within a load center or electrical panel, is a bottom side in the orientation shown in FIG. 1.

Each of the two circuit breakers (e.g., the second circuit breaker 110) includes a handle 124 (e.g., a first handle). In one embodiment, the handle 124 is a single handle that shuts down both poles of, for example, the respective double pole circuit breaker (e.g., the second circuit breaker 110) when one of the two poles is tripped. In another embodiment, the handle 124 includes a separate handle for each of the poles (e.g., two handles) of the two poles of the respective double pole circuit breaker, and a tie bar connected to the two handles. When one of the two poles of the respective circuit breaker trips, the tie bar causes the other of the two poles of the second circuit breaker 110, for example, to also trip.

The handle 124 has, for example, two or three discrete positions relative to the housing 112 of the respective circuit breaker (e.g., the second circuit breaker 110) corresponding to different states of the respective circuit breaker. For example, the handle 124, in a typical orientation with the first side 116 facing upwards, may have an upwards or top position, in which the respective circuit breaker is "ON" and a downwards or bottom position, in which the respective circuit breaker is "OFF." The handle 124 may also have a middle, neutral position, in which the handle 124 is positioned when the respective circuit breaker is tripped.

In one embodiment, the handle 124 may be movably attached to the housing 112 of the respective circuit breaker, such that the handle 124 rotates between the two or three discrete positions relative to the housing 112 of the respective circuit breaker. In another embodiment, the handle 124 may be movably attached to the housing 112 of the respective circuit breaker, such that the handle 124 translates between the two or three discrete positions relative to the housing 112 of the respective circuit breaker.

When an orientation of the respective circuit breaker is flipped, such that the first side 116 faces downward, as shown for the second circuit breaker 110 in FIG. 1, a user sees the handle 124 in a downward position (e.g., relative to a housing of the modular meter stack 100) when the second circuit breaker 110 is "ON," and sees the handle 124 in an upward position (e.g., relative to the housing of the modular meter stack 100) when the second circuit breaker 110 is "OFF." This may be confusing to the user and/or may be against code and/or standards.

FIG. 1 shows a reversed handle operation device 150 of the present embodiments attached to the second circuit breaker 110. The reversed handle operation device 150 at least partially covers an outer surface 152 of the respective circuit breaker (e.g., the second circuit breaker 110), and includes a handle 154 (e.g., a second handle) that moves away from the first handle 124 (e.g., of the second circuit breaker 110), for example. For example, rotation of the second handle 154 in a first direction (e.g., a first rotational direction) relative to the housing 112 of the second circuit breaker 110 (e.g., or relative to a housing of the reversed handle operation device 150), for example, causes the first handle 124 to move (e.g., rotate) in a second direction (e.g., a second rotational direction) away from the first direction (e.g., opposite the first rotational direction). Accordingly, when the first handle 124 of the second circuit breaker 110 is in the "ON" position (e.g., the downward or bottom position), the second handle 154 of the reversed handle operation device 150 is in an upward or top position. With the reversed handle operation device 150 attached to the second circuit breaker 110, for example, the user cannot see or can only see a portion of the first handle 124, but can see all of the second handle 154 of the reversed handle operation device 150. Accordingly, the handle the user sees all of, the second handle 154 of the reversed handle operation device 150, is in the upward or top position when the second circuit breaker 110, for example, is "ON."

Referring to FIGS. 2-5, the reversed handle operation device 150 includes a housing 200. The housing 200 is, for example, a mounting plate. The mounting plate 200 includes a first side 202, a second side 204 opposite the first side 202, a third side 206 that extends between the first side 202 and the second side 204, and a fourth side 208 that is opposite the third side 206 and extends between the first side 202 and the second side 204.

The mounting plate 200 has an outer surface 210 and an inner surface 212 opposite the outer surface 210. A size and shape of the outer surface 210 and the inner surface 212 are defined by the sizes and shapes of the first side 202, the second side 204, the third side 206, and the fourth side 208 of the mounting plate 200, respectively. The mounting plate 200 may be any number of shapes and/or sizes. For example, as shown in FIGS. 2-5, the mounting plate 200 may be rectangular in shape, and the mounting plate 200 may be sized to fit a particular circuit breaker (e.g., the second circuit breaker 110 of FIG. 1).

The mounting plate 200 may be made of any number of materials. For example, the mounting plate 200 may be made of a metal such as, for example, sheet metal. For example, the mounting plate 200 may be made of aluminum sheet metal, stainless steel sheet metal, or another metal. In other embodiments, the mounting plate 200 may be made of another material such as, for example, a plastic.

At least parts of the first side 202, the second side 204, the third side 206, and the fourth side 208 may extend away from (e.g., downward relative to) the inner surface 212 of the mounting plate 200. In other words, a height or thickness (e.g., in a direction perpendicular to the outer surface 210 and/or the inner surface 212 of the mounting plate 200) of the mounting plate 200 may be greater at the first side 202, the second side 204, the third side 206, and the fourth side 208 compared to a thickness of the mounting plate 200 between the outer surface 210 and the inner surface 212 of the mounting plate 200. This allows the first side 202, the second side 204, the third side 206, and the fourth side 208 of the mounting plate 200 to be positioned around a portion of a circuit breaker (e.g., the second circuit breaker 110 of FIG. 1) to which the mounting plate 200 of the reversed handle operation device 150 is attachable.

The reversed handle operation device 150 includes a lever 220 that is rotatably attached to the mounting plate 200. The lever 220 may be rotatably attached to the mounting plate 200 in any number of ways. For example, the reversed handle operation device 150 includes a first tab 222 extending away from the outer surface 210 of the mounting plate 200 (e.g., in a direction perpendicular to the outer surface 210 of the mounting plate 200) at the third side 206 of the mounting plate 200, and a second tab 224 extending away from the outer surface 210 of the mounting plate 200 (e.g., in a direction perpendicular to the outer surface 210 of the mounting plate 200) at the fourth side 208 of the mounting plate 200. The reversed handle operation device 150 also includes a shaft 226 that extends between the first tab 222 and the second tab 224. The shaft 226 may be positionally fixed (e.g., rotationally fixed) relative to the first tab 222 and the second tab 224. The shaft 226 extends through an opening (not shown) through the lever 220, and the lever 220 is rotatable relative to the mounting plate 200 about the shaft 226.

The shaft 226 may be attached to the first tab 222 and the second tab 224 in any number of ways. For example, the first tab 222 may include an opening 228 through the first tab 222, and the second tab 224 may include an opening 230 through the second tab 224. The shaft 226 may be threaded (e.g., on one or both ends of the shaft 226). The shaft 226 may extend through the opening 228 through the first tab 222 and/or the opening 230 through the second tab 224 (e.g., only through the opening 230 through the second tab 224). A respective connector 232 such as, for example, a bolt may extend through the opening 228 through the first tab 222 and/or the opening 230 through the second tab 224 and may connect the shaft 226 to the first tab 222 and/or the second tab 224, such that the shaft 226 is positionally fixed (e.g., rotationally fixed) relative to the mounting plate 200. The shaft 226 may be positionally fixed relative to the first tab 222 and/or the second tab 224 in any number of other ways. For example, the first tab 222, the second tab 224, and the shaft 226 may be formed (e.g., 3D-printed) as a single part.

The first tab 222 and the second tab 224 may be made of any number of materials. For example, the first tab 222 and the second tab 224 may be extensions of (e.g., formed integrally with) the mounting plate 220 and may, for example, be made of sheet metal (e.g., aluminum sheet metal or stainless steel sheet metal). In one embodiment, the first tab 222 and the second tab 224 are separate parts from the mounting plate 220 and are attached to the mounting plate 220 using, for example, connectors (e.g., rivets). The shaft 226 may be made of any number of materials. For example, the shaft 226 may be made of a metal such as, for example, stainless steel. In other embodiments, the shaft 226 is made of other materials (e.g., a plastic or another metal).

The reversed handle operation device 150 may include spacers 234 disposed on opposite sides of the lever 220, respectively. The spacers 234 are, for example, attached to the opposite sides of the lever 220 (e.g., with connectors and/or an adhesive), or the spacers 234 are formed (e.g., molded or 3D printed) with the lever 220 as a single part. The spacers 234 limit a range of translational motion of the lever 220 along the shaft 226. In the embodiment shown in FIGS. 2-5, the lever 220 is able to translate along the shaft 226, but the spacers 234 limit the range of motion. In another embodiment, the spacers 234 are in contact with both the lever 220 and the first tab 222 and the second tab 224, respectively, such that the lever 220 does not translate along the shaft 226.

The spacers 234 may be any number of different shapes. For example, the spacers 234 may be semi-cylindrical. In one embodiment, the spacers 234 are cylindrical. The spacers 234 may be other shapes. The spacers 234 may be made of any number of materials. For example, the spacers 234 are made of a plastic. In one embodiment, the spacers 234 are made of a same material as the lever 220.

The mounting plate 200 may include one or more openings (e.g., windows) through the mounting plate 200 (e.g., extending from the outer surface 210, through the mounting plate 200, to the inner surface 212). For example, the mounting plate 200 includes a first window 236, a second window 238, and a third window 240. The first window 236 may be positioned underneath the lever 220 and may be sized and shaped to allow a handle of a circuit breaker (e.g., the first handle 124 of the second circuit breaker 110) to extend through and move within the first window 236. The second window 238 and the third window 240 may be sized, shaped, and positioned to allow labels (e.g., UL labels) on the circuit breaker to which the reversed handle operation device 150 is attached (e.g., the second circuit breaker 110) to be viewed by the user. The mounting plate 200 may include more, fewer, and/or different windows.

The mounting plate 200 includes a first flange 242 that extends away from the first side 202 of the mounting plate 200, and a second flange 244 that extends away from the second side 204 of the mounting plate 200. The first flange 242 extends away from the first side 202 of the mounting plate 200 (e.g., in a direction perpendicular to the first side 202 of the mounting plate 200). The first flange 242 extends away from the first side 202 of the mounting plate 200 at a distance away from the inner surface 212 of the mounting plate 200, along the first side 202 of the mounting plate 200. The second flange 244 extends away from the second side 204 of the mounting plate 200 (e.g., in a direction perpendicular to the second side 204 of the mounting plate 200). The second flange 244 extends away from the second side 204 of the mounting plate 200 at a distance away from the inner surface 212 of the mounting plate 200, along the second side 204 of the mounting plate 200. The mounting plate 200 has, for example, a stepped profile (e.g., viewed from the third side 206) at the first side 202 and the second side 204 of the mounting plate 200.

The reversed handle operation device 150 may include one or more connectors configured to retain the reversed handle operation device 150 on the circuit breaker (e.g., the second circuit breaker 110) when the reversed handle operation device 150 is positioned on the circuit breaker. In the embodiment shown in FIGS. 2-5, the reversed handle operation device 150 includes two connectors. The two connectors include, for example, a first connector 250 and a second connector 252. In other embodiments, the reversed handle operation device 150 includes more or fewer connectors configured to retain the reversed handle operation device 150 on the circuit breaker.

The first connector 250 and the second connector 252 may be any number of different types of connectors including, for example, spring retainers. For example, the first spring retainer 250 extends along a length of the third side 206 of the mounting plate 200 and away from the inner surface 212 of the mounting plate 200 (e.g., in a direction perpendicular to the inner surface 212 of the mounting plate 200), and is attached to the first flange 242 and the second flange 244 at and/or adjacent to the third side 206 of the mounting plate 200. The first spring retainer 250 may be attached to the first flange 242 and the second flange 244 in any number of ways including, for example, with rivets 254. Other types of connections may be provided. For example, the first spring retainer 250 may be attached to the first flange 242 and the second flange 244 with two or more fasteners (e.g., screws and/or nut/bolt combinations), welds, an adhesive, and/or other connectors. In one embodiment, the first spring retainer 250 is formed with the mounting plate 200 as a single part.

The first spring retainer 250 may be any number of shapes and sizes. For example, the first spring retainer 250 may be trapezoidal in shape, u-shaped, v-shaped, or another shape. The first spring retainer 250 may be made of any number of materials including, for example, stainless steel, titanium, nickel alloy, or another material.

The second spring retainer 252 may extend along a length of the fourth side 208 of the mounting plate 200 and away from the inner surface 212 of the mounting plate 200 (e.g., in a direction perpendicular to the inner surface 212 of the mounting plate 200), and is attached to the first flange 242 and the second flange 244 at and/or adjacent to the fourth side 208 of the mounting plate 200. The second spring retainer 252 may be attached to the first flange 242 and the second flange 244 in any number of ways including, for example, with rivets 254. Other types of connections may be provided. For example, the second spring retainer 252 may be attached to the first flange 242 and the second flange 244 with two or more fasteners (e.g., screws and/or nut/bolt combinations), welds, an adhesive, and/or other connectors. In one embodiment, the second spring retainer 252 is formed with the mounting plate 200 as a single part.

The second spring retainer 252 may be any number of shapes and sizes. For example, the second spring retainer 252 may be trapezoidal in shape, u-shaped, v-shaped, or another shape. The second spring retainer 252 may be made of any number of materials including, for example, stainless steel, titanium, nickel alloy, or another material.

Each of the first spring retainer 250 and the second spring retainer 252 may include fingers 256 configured to engage with sides of the circuit breaker (e.g., the second circuit breaker 110) to which the reversed handle operation device 150 is attached. For example, each of the first spring retainer 250 and the second spring retainer 252 includes two fingers 256. The first spring retainer 250 and the second spring retainer 252 may each include more or fewer fingers 256.

Figure 5:
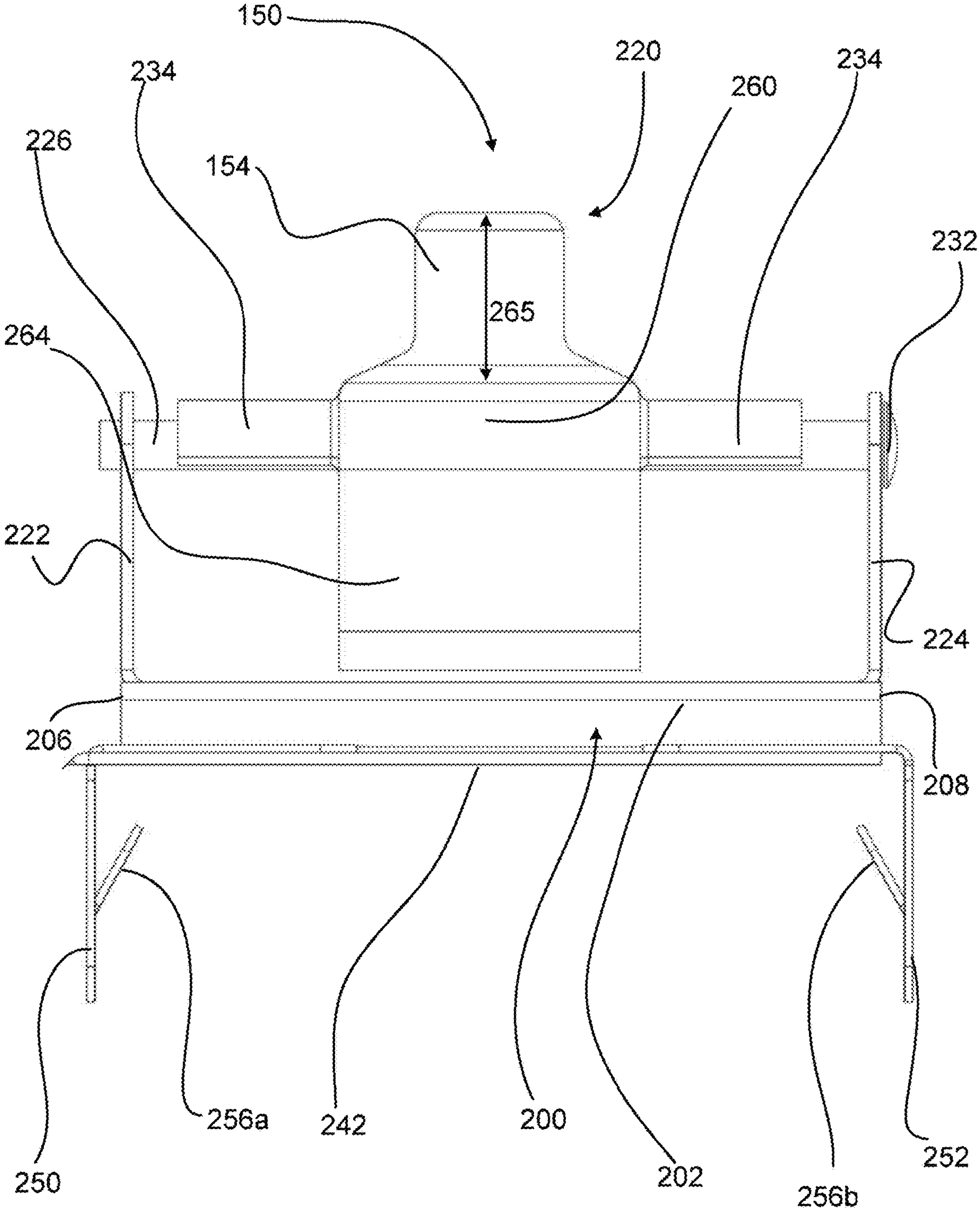
FIG. 5 is a front view of the reversed handle operation device of FIG. 2.

Referring to FIG. 5, a finger **256*a* of the first spring retainer 250 and a finger 256*b* of the second spring retainer 252 opposite the finger 256*a* of the first spring retainer 250 may extend towards each other, such that friction between the first spring retainer 250 and the circuit breaker (e.g., the second circuit breaker 110) to which the reversed handle operation device 150 is attached and friction between the second spring retainer 252 and the circuit breaker are increased. One or more additional pairs of fingers 256 of the first spring retainer 250 and the second spring retainer 252, respectively, (e.g., opposite each other) may be provided. The fingers 256 help keep the reversed handle operation device 150 on the circuit breaker (e.g., the second circuit breaker 110**) once installed.

The lever 220 may be any number of shapes. For example, the lever 220 may be A-shaped or V-shaped. Other shapes may be provided. For example, the lever 220 includes a body 260 (e.g., a central body) with the handle 154 (e.g., the second handle) and at least one arm extending away from the body 260. The opening through the lever 220 (e.g., through which the shaft 226 extends) may extend through the body 260 of the lever 220. The body 260 of the lever 220 may be any number of shapes and sizes. For example, the body 260 of the lever 200 may be a rectangular prism. Other shapes may be provided for the body 260 of the lever 220.

In the embodiment shown in FIGS. 2-5, the lever 220 includes the handle 154, a first arm 262, and a second arm 264 extending away from the body 260 of the lever 220 in different directions, respectively. Referring to FIG. 5, when the lever 220 is in a central position (e.g., a non-rotated position), a height 265 of the handle 154 extends in a direction perpendicular to the outer surface 210 of the mounting plate 200 (see FIG. 5). The lever 220 may, for example, be symmetrical about a plane of symmetry 266 that extends through the handle 154 (see FIG. 4). A length 268 of the first arm 262 and a length 270 of the second arm 264 extend away from the body 260 of the lever 220 and the handle 154 in directions at angles relative to the plane of symmetry 266, respectively (see FIG. 3). For example, the length 268 of the first arm 262 and the length 270 of the second arm 264 extend away from the body 260 of the lever 220 at, for example, 30 degree, 35 degree, 40 degree, or 45 degree angles on opposite sides of the plane of symmetry 266, respectively. The handle 154, the first arm 262, and/or the second arm 264 may extend away from the body 260 of the lever 220 in different directions.

The handle 154 may be any number of shapes including, for example, a trapezoidal prism, a cube, a rectangular prism, or another shape. The first arm 262 and the second arm 264 may be any number of shapes including, for example, an elliptical cylinder. The first arm 262 and the second arm 264 are, for example, paddles. The first arm 262 and the second arm 264 may be a same shape or different shapes. Other shapes may be provided for the handle 154, the first arm 262, and/or the second arm 264.

The height 265 of the handle 154, the length 268 of the first arm 262, and the length 270 of the second arm 264 may be any number of sizes. For example, the height 265 of the handle 154 is 1.25 inches, and the length 268 of the first arm 262 and the length 270 of the second arm 264 are 1.50 inches, respectively. Other sizes may be provided.

Figure 6:
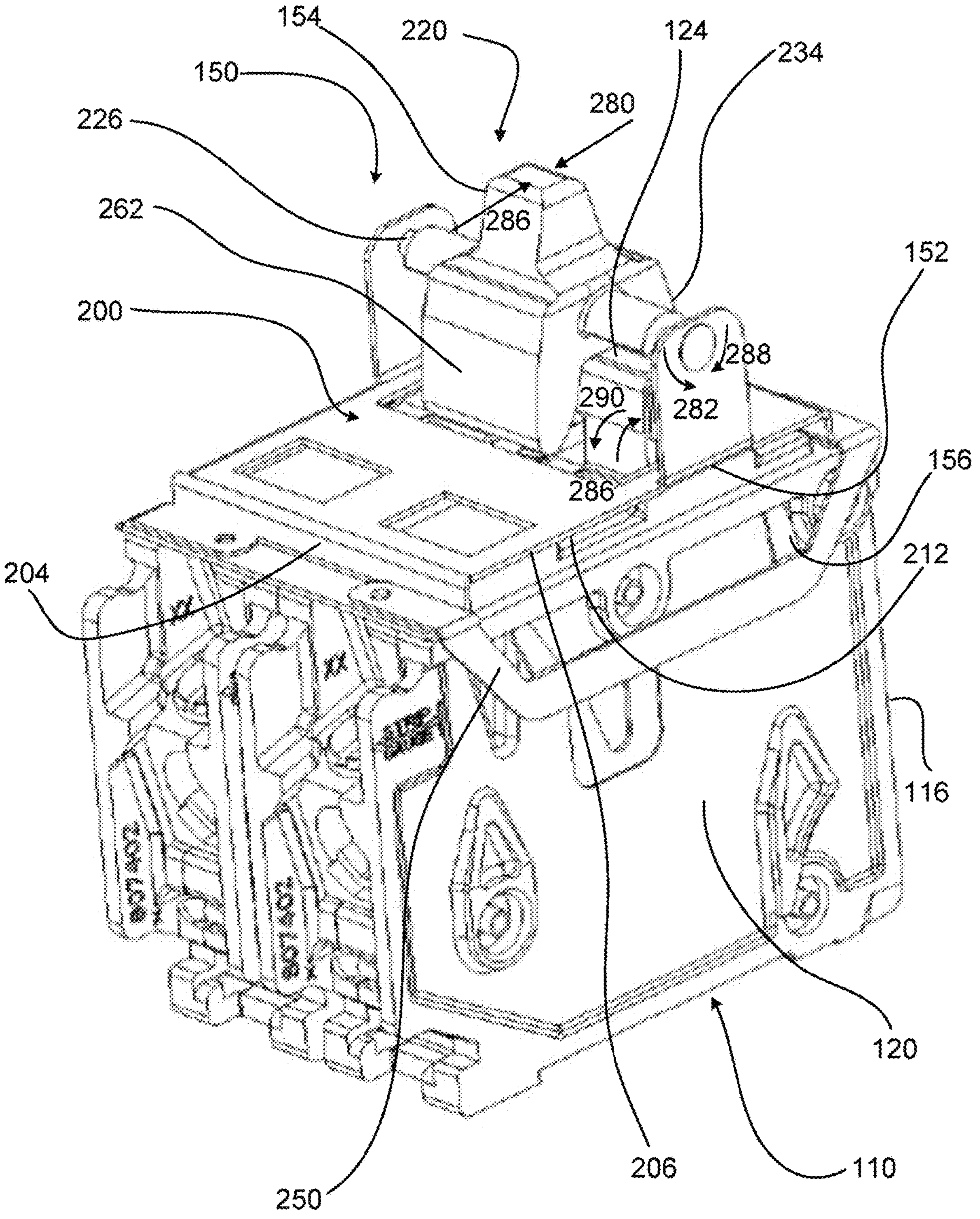
FIG. 6 is a perspective view of one embodiment of a reversed handle operation device attached to a circuit breaker.
Figure 7:
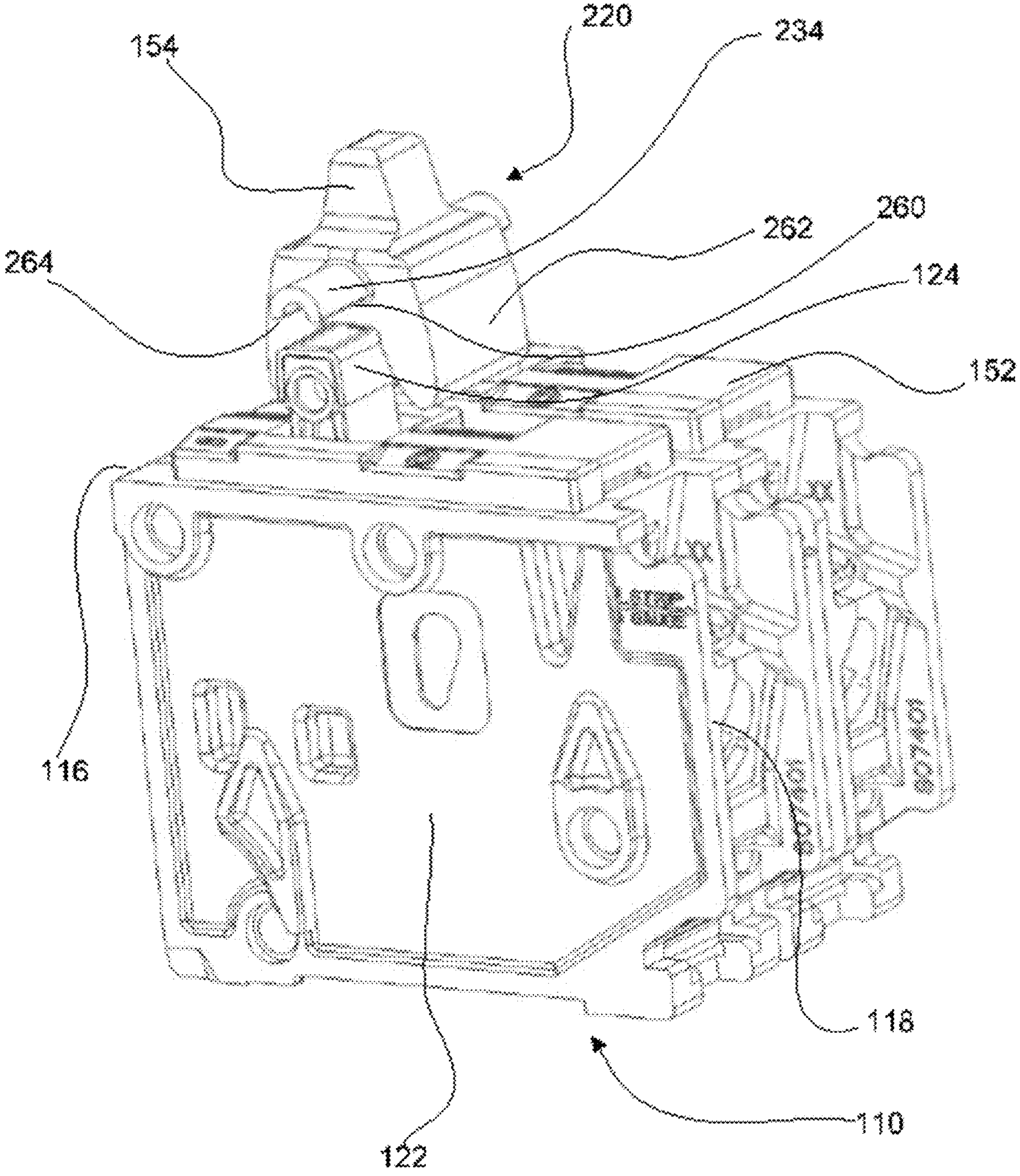
FIG. 7 is a perspective view of a portion of the reversed handle operation device of FIG. 6 attached to the circuit breaker.

Referring to FIGS. 6 and 7, the reversed handle operation device 150 may be attached to the outer surface 152 of the circuit breaker (e.g., the second circuit breaker 110), such that the inner surface 212 of the mounting plate 200 is in contact with the outer surface 152 of the second circuit breaker 110, for example. When the reversed handle operation device 150 is attached to the second circuit breaker 110, for example, the handle 154 (e.g., the second handle) of the reversed handle operation device 150 is positioned over (e.g., on top of) the handle 124 (e.g., the first handle) of the second circuit breaker 110. With the handle 154 of the reversed handle operation device 150 positioned over the handle 124 of the second circuit breaker 110, the first arm 262 and the second arm 264 of the lever 220 are disposed on opposite sides of the handle 124 of the second circuit breaker 110, respectively.

A first force may be applied to the handle 154 of the lever 220 of the reversed handle operation device 150 in a first force application direction 280 (see FIG. 4) to cause the lever 220 to rotate in a first rotational direction 282 (e.g., counterclockwise when viewed from the third side 206 of the mounting plate 200) about the shaft 226. The rotation of the lever 220 about the shaft 226 in the first rotational direction 282 causes the handle 154 of the lever 220 to move towards the second side 204 of the mounting plate 200, and causes the first arm 262 of the lever 220 to come into contact with the handle 124 of the second circuit breaker 110 and move the handle 124 of the second circuit breaker 110 in a second direction 284 (e.g., a second rotational direction opposite the first rotational direction 282; clockwise when viewed from the third side 120 of the second circuit breaker 110). In other words, rotation of the handle 154 of the lever 220 of the reversed handle operation device 150 in the first rotational direction 282 causes motion of the handle 124 of the second circuit breaker 110, for example, away from the handle 154 of the lever 220 of the reversed handle operation device 150.

FIGS. 6 and 7 show, for example, a central, tripped position of the handle 124 of the second circuit breaker 110 and a central position of the handle 154 of the lever 220 of the reversed handle operation device 150. The movement of the handle 154 of the lever 220 of the reversed handle operation device 150 in the first rotational direction 282, which causes the movement of the handle 124 of the second circuit breaker 110 in, for example, the second rotational direction 284, moves the handle 154 into an upwards or top position (e.g., towards the second side 204 of the mounting plate 200), and moves the handle 124 into an "ON" position (e.g., the bottom or downwards position of the handle 124 with the orientation of the second circuit breaker 110 shown in FIG. 1) towards the first side 116 of, for example, the second circuit breaker 110.

A second force may be applied to the handle 154 of the lever 220 of the reversed handle operation device 150 in a second force application direction 286 (e.g., opposite the first force application direction 280) to cause the lever 220 to rotate in a third rotational direction 288 (e.g., clockwise when viewed from the third side 206 of the mounting plate 200, a same rotational direction as the second rotational direction) about the shaft 226. The rotation of the lever 220 about the shaft 226 in the third rotational direction 288 causes the handle 154 of the lever 220 to move towards the first side 202 of the mounting plate 200, and causes the second arm 264 of the lever 220 to come into contact with the handle 124 of the second circuit breaker 110 and move the handle 124 of the second circuit breaker 110 in a fourth direction 290 (e.g., a fourth rotational direction opposite the second rotational direction 284, a same rotational direction as the first rotational direction 282; counterclockwise when viewed from the third side 120 of the second circuit breaker 110). In other words, rotation of the handle 154 of the lever 220 of the reversed handle operation device 150 in the third rotational direction 288 causes motion of the handle 124 of the second circuit breaker 110, for example, away from the handle 154 of the lever 220 of the reversed handle operation device 150.

The movement of the handle 154 of the lever 220 of the reversed handle operation device 150 in the third rotational direction 288, which causes the movement of the handle 124 of the second circuit breaker 110 in, for example, the fourth rotational direction 290, moves the handle 154 into an downwards or bottom position (e.g., towards the first side 202 of the mounting plate 200) and moves the handle 124 into an "OFF" position (e.g., the top or upwards position of the handle 124 with the orientation of the second circuit breaker 110 shown in FIG. 1) towards the second side 118 of, for example, the second circuit breaker 110.

FIG. 6 shows the first spring retainer 250 engaged with the third side 120 of the second circuit breaker 110, for example, to keep the reversed handle operation device 150 on the second circuit breaker 110. The two fingers 256 of the first spring retainer 250 are also engaged with the third side 120 of the second circuit breaker 110 to keep the reversed handle operation device 150 on the second circuit breaker 110. Though not shown in FIG. 6, the second spring retainer 252 and the two fingers 256 of the second spring retainer 252 are engaged with the fourth side 122 of the second circuit breaker 110.

The reversed handle operation device 150 may be manufactured in any number of ways. For example, sheet metal used to form the mounting plate 200 may be laser cut and stamped. The lever 220 and the spacers 234 may, for example, be molded or 3D printed. Other methods of manufacturing may be used to manufacture the reversed handle operation device 150.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A device for reversed operation of a first handle, the first handle being of a circuit breaker, the device comprising:
a housing that is attachable to the circuit breaker; and
a lever that is rotatably attached to the housing, the lever comprising:
a body; and
an arm and a second handle each extending away from the body,
wherein the lever is movable in a first direction relative to the housing in response to a force at the second handle, such that when the housing is attached to the circuit breaker and the lever moves in the first direction relative to the housing, the first arm is configured to press against and move the first handle of the circuit breaker in a second direction relative to the housing, the second direction being away from the first direction.

2. The device of claim 1, wherein the first direction is a first rotational direction, and the second direction is a second rotational direction, the second rotational direction being opposite the first rotational direction.

3. The device of claim 1, wherein the arm is a first arm,
wherein the lever further comprises a second arm that extends away from the body of the lever,
wherein when the housing is attached to the circuit breaker, the lever is positioned over the first handle, such that the first arm and the second arm are disposed on opposite sides of the first handle, respectively.

4. The device of claim 3, wherein the lever is movable in a third direction relative to the housing, such that when the housing is attached to the circuit breaker and the lever moves in the third direction relative to the housing, the second arm is configured to press against and move the first handle of the circuit breaker in a fourth direction relative to the housing, the fourth direction being away from the third direction.

5. The device of claim 1, wherein the housing is a mounting plate.

6. The device of claim 5, wherein the mounting plate has a first side and a second side opposite the first side,
wherein the device further comprises:
a first connector extending away from the mounting plate at the first side of the mounting plate; and
a second connector extending away from the mounting plate at the second side of the mounting plate,
wherein the first connector is configured to engage with a first side of a housing of the circuit breaker, and the second connector is configured to engage with a second side of the housing of the circuit breaker that is opposite the first side of the housing of the circuit breaker.

7. The device of claim 6, wherein the first connector and the second connector are spring retainers.

8. The device of claim 5, wherein the mounting plate has a first side, a second side, and an outer surface extending between the first side and the second side, the second side being opposite the first side, wherein the device further comprises:

a first tab extending away from the outer surface of the mounting plate at the first side of the mounting plate;

a second tab extending away from the outer surface of the mounting plate at the second side of the mounting plate; and a shaft attached to and extending between the first tab and the second tab, respectively, and wherein the lever is rotatable about the shaft.

9. The device of claim 8, further comprising at least one window extending through the mounting plate at the outer surface.

10. The device of claim 8, further comprising:

a first spacer positioned about the shaft and between the first tab and the lever; and a second spacer positioned about the shaft and between the second tab and the lever.

11. The device of claim 10, wherein the first spacer and the second spacer are attached to opposite sides of the body of the lever, respectively.

12. The device of claim 11, wherein the lever, the first spacer, and the second spacer form a single part.

13. The device of claim 12, wherein the lever, the first spacer, and the second spacer are made of a plastic, and the mounting plate is made of sheet metal.

14. A device for reversed operation of a first handle, the first handle being of a circuit breaker, the device comprising:

a mounting plate that is attachable to the circuit breaker;

a lever that is rotatably attached to the mounting plate, the lever comprising:

a body; and a first arm, a second arm, and a second handle each extending away from the body, wherein when the mounting plate is attached to the circuit breaker, the lever is positioned over the first handle, such that the first arm and the second arm are disposed on opposite sides of the first handle, respectively, wherein the lever is movable in a first direction relative to the mounting plate in response to a first force at the second handle, such that when the mounting plate is attached to the circuit breaker and the lever moves in the first direction relative to the mounting plate, the first arm is configured to press against and move the first handle of the circuit breaker in a second direction relative to the mounting plate, the second direction being away from the first direction, and wherein the lever is movable in a third direction relative to the mounting plate, such that when the mounting plate is attached to the circuit breaker and the lever moves in the third direction relative to the mounting plate, the second arm is configured to press against and move the first handle of the circuit breaker in a fourth direction relative to the mounting plate, the fourth direction being away from the third direction.

15. The device of claim 14, wherein the mounting plate has a first side, a second side, and an outer surface extending between the first side and the second side, the second side being opposite the first side, wherein the device further comprises:

a first tab extending away from the outer surface of the mounting plate at the first side of the mounting plate;

a second tab extending away from the outer surface of the mounting plate at the second side of the mounting plate; and a shaft attached to and extending between the first tab and the second tab, respectively, and wherein the lever is rotatable about the shaft.

16. The device of claim 15, further comprising:

a first spring retainer extending away from the mounting plate at the first side of the mounting plate; and a second spring retainer extending away from the mounting plate at the second side of the mounting plate, wherein the first spring retainer is configured to engage with a first side of a housing of the circuit breaker, and the second spring retainer is configured to engage with a second side of the housing of the circuit breaker that is opposite the first side of the housing of the circuit breaker.

17. The device of claim 15, further comprising:

a first spacer positioned about the shaft and between the first tab and the lever, the first spacer being attached to a first side of the body of the lever; and a second spacer positioned about the shaft and between the second tab and the lever, the second spacer being attached to a second side of the body of the lever, the second side of the body of the lever being opposite the first side of the body of the lever.

18. A circuit breaker assembly comprising:

a circuit breaker comprising:

a first housing; and a first handle movably attached to the first housing;

a device for reversed operation of the first handle of the circuit breaker, the device comprising:

a lever comprising:

a body; and a first arm, a second arm, and a second handle each extending away from the body, a second housing that is removably attached to the first housing of the circuit breaker, such that the lever is positioned over the first handle, and the first arm and the second arm of the lever are disposed on opposite sides of the first handle, respectively, wherein the lever is rotatably attached to the second housing and rotatable in a first direction relative to the second housing in response to a force at the second handle, such that when the lever rotates in the first direction relative to the housing, the first arm is configured to press against and move the first handle of the circuit breaker in a second direction relative to the second housing, the second direction being away from the first direction.

19. The circuit breaker of claim 18, wherein the second housing has a first side, a second side, and an outer surface extending between the first side and the second side, the second side being opposite the first side, wherein the device further comprises:

a first tab extending away from the outer surface of the second housing at the first side of the second housing;

a second tab extending away from the outer surface of the second housing at the second side of the second housing; and a shaft attached to and extending between the first tab and the second tab, respectively, and wherein the lever is rotatable about the shaft.

20. The circuit breaker of claim 19, wherein the device further comprises:

a first connector extending away from the second housing at the first side of the mounting plate; and a second connector extending away from the second housing at the second side of the mounting plate, wherein the first connector is configured to engage with a first side of the first housing of the circuit breaker, and the second connector is configured to engage with a second side of the first housing that is opposite the first side of the first housing.

* * * * *